3,077,479
PURIFICATION OF SULFOLENE
Daniel B. Luten, Jr., and Friedrich G. Helfferich, Berkeley, Calif., assignors to Shell Oil Company, New York, N.Y., a corporation of Delaware
No Drawing. Filed May 5, 1961, Ser. No. 107,931
9 Claims. (Cl. 260—332.1)

This invention relates to the manufacture of sulfolane and homologues thereof, particularly lower alkyl sulfolanes of up to about eight carbon atoms. More particularly, it relates to an improvement in the reaction of 1,3-diolefins with sulfur dioxide to form sulfolenes and the catalytic hydrogenation of the sulfolenes to sulfolanes.

The sulfolanes are well known solvents useful in extractive distillations, solvent extractions, and the like, especially in petroleum processing for the separation of hydrocarbon mixtures. They are prepared by reacting a conjugated diolefin with sulfur dioxide and hydrogenating the resulting sulfolene to the corresponding sulfolane. Thus, sulfolane and the mono- and dimethyl sulfolanes are prepared by reacting butadiene, methylbutadiene (isoprene, trans-piperylene), and dimethylbutadienes with sulfur dioxide to form sulfolene, methyl sulfolene, and dimethyl sulfolene, respectively, and then catalytically hydrogenating the particular sulfolene, as by using a Raney nickel catalyst, to the corresponding sulfolane.

The crude reaction product from the reaction of the diolefin with sulfur dioxide, even after conventional removal of excess $SO_2$ and any insoluble polysulfones, is not readily hydrogenated with any practical degree of efficiency due to short catalyst life. The exact nature of the catalyst poison(s) is not known. There seem to be various possibilities. Neutralization with caustic followed by separation from inorganic sulfite salt formed from excess sulfur dioxide, or simply stripping with an inert gas, have not solved the problem. Heretofore, the difficulty has been reduced by fractional crystallization of the sulfolene from the reaction product in an attempt to provide a purer sulfolene for the hydrogenation. This technique, however, is not only time-consuming and requires considerable capital expenditure for plant-scale operation, but it results in a substantial reduction in yield of sulfolane.

A well known method for producing the sulfolene comprises conducting the reaction between the conjugated alkadiene and sulfur dioxide in a solution of a monohydric alcohol having from 1 to 4 carbon atoms, such as, for example, isopropanol. The product sulfolene is subsequently hydrogenated to form sulfolane usually in the presence of Raney nickel catalyst. This type of catalyst, as has been considered hereinbefore, is suscpetible to poisoning by sulfur-containing materials, and especially by sulfur dioxide. Moreover, the diolefin plus sulfur dioxide reaction is reversible, and upon standing the sulfolene product reverts in part into its constituents including sulfur dioxide.

It is therefore a principal object of this inventon to provide improved means for the treatment of the reaction products of butadiene and related conjugated diolefins, e.g., butadienes of 4 to 8 carbon atoms, with sulfur dioxide whereby a sulfolene is formed. It is a further object to provide an improved and greatly refined sulfolene product for hydrogenation with a sulfur-sensitive catalytic material, as for example, Raney nickel.

Another important object of the invention is to remove sulfur dioxide from sulfolene, thereby providing a feed of higher quality for further chemical processing. A still further object of the invention is to provide an improved process for the synthesis of sulfolane. Other objects and features of advantage will be apparent from a consideration of the following description of the invention.

The condensation product of sulfur dioxide with butadiene is, as has been set forth heretofore, sulfolene. It is preferred to carry out this reaction so as to obtain 3-sulfolene isomer which is more readily hydrogenated than 2-sulfolene. This material, after treatment to deactivate catalyst poisons, is then hydrogenated at about 30° C. over Raney nickel catalyst with a conversion of about 97%. In general, this hydrogenation should be carried out within about 12 hours, and preferably within about 6 hours, following the purification treatment; substantially immediate hydrogenation is advantageous.

Sulfolene can also be produced by reacting sulfur dioxide and butadiene at about 95° C. in an isopropanol solution. At 1:1 mole ratio of sulfur dioxide to butadiene the conversion to sulfolene of the butadiene is about 60–65%. According to earlier procedures both unreacted sulfur dioxide and butadiene are removed by boiling at about 60° C. and 15 p.s.i.a. Following this, the composition of the reactant mixture is predominantly as indicated in Table I.

TABLE I

| Component: | Percent wt. |
|---|---|
| Isopropanol | 66.5 |
| Sulfur dioxide | 3.0 |
| Polysulfone | 0.5 |
| Sulfolene | 30.0 |

From the foregoing Table I, it will be appreciated that 3% by weight sulfur dioxide still remains. Even if this existing sulfur dioxide were completely removed by stripping, decomposition of sulfolene during storage or extended handling will produce additional sulfur dioxide. It is important that sulfolene solution be stored in a slightly warm environment in view of its solubility limitations. The decomposition rate constant at 40° C. is $5 \times 10^{-7}$ per minute. Calculations based on this rate constant indicate that after one week's storage of 30% w. solution of sulfolene at 40° C., the material will contain about 770 p.p.m. sulfur dioxide.

In accordance with the present invention the sulfur dioxide present in the reaction products from the sulfolene synthesis in a solution of alcohol is removed by means of anionic exchange with a "strong base" anion exchanger resin in salt form. Sulfur dioxide can be removed from the sulfolene by an anion exchanger in $OH^-$ form, but the $OH^-$ ions catalyze the addition of alcohols (as well as any water present) to the sulfolene double bond. It has, however, been found that the use of the anion exchanger in the $CO_3^=$ form effectively removes the sulfur dioxide without adversely affecting the sulfolene. In accordance therewith, the primary process for the sulfur dioxide removal is delineated by the following equation:

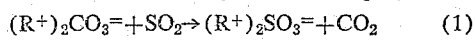

where $R^+$ represents a fixed cationic group, e.g., quaternary ammonium ion, of the exchange resin. The carbon dioxide byproduct is easily removed by heating where such removal is found necessary, although its presence may be tolerated in relatively large amounts during the subsequent hydrogenation. In actual practice, it has been found that the sulfur dioxide removal is twice that indicated by the foregoing Equation 1 and, in view of the fact that traces of water are generally present in the alcohol, the additional uptake probably occurs according to

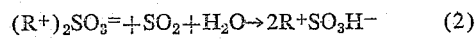

Over-all the reaction then can be represented as:

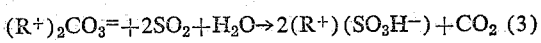

In view of the fact that the reversion of sulfolene on standing forms undesired $SO_2$, it is most advantageous to provide for the removal of the contaminating $SO_2$ immediately prior to the catalytic hydrogenation step.

As a further important advantage of the invention the ion exchange bed can be readily regenerated with aqueous $Na_2CO_3$. In performing the regeneration, it is advantageous to drain the column and to effect the regeneration by upflow therethrough in view of the fact that the resin expands when it is brought into contact with an aqueous solution. Moreover, if water is particularly objectionable in the product, it can be removed from the column following regeneration by washing briefly with an alcohol such as methanol or isopropyl alcohol. A liberal excess of $Na_2CO_3$ may be found desirable even up to, say 800% of the stoichiometric amount. The regeneration efficiency depends to a great degree on such variables as column dimensions, conditions of operation, and purity required of the product. In plant-scale operations, from about 150 to 250% of the stoichiometric amount will be found sufficient.

Alternatively, the exhausted resin which is the $HSO_3^-$ form can be regenerated without contacting it with an aqueous solution. For this purpose, the resin is first converted to the $OH^-$ form by treatment with a base such as KOH in alcoholic solution, and then the $OH^-$ form is converted to the desired $CO_3^=$ form by passing gaseous $CO_2$ through the column after the interstitial alcoholic solution has been drained. A liberal excess of base even up to, say, 800% of the stoichiometric amount may be desirable to obtain complete conversion to the $OH^-$ form, but usually from about 150 to 200% of the stoichiometric amount will be economically more advantageous.

Sulfur dioxide can also be removed by anion exchangers of the above-mentioned type in the $SO_3^=$ form. The mechanism of $SO_2$ uptake then is exclusively reaction 2. The advantage of this method is that the column can be regenerated for renewed use simply by washing with solvent, thus reverting reaction 2. However, the capacity of the resin for $SO_2$ uptake when used in the $SO_3^=$ form is only half as high as when used in the $CO_3^=$ form.

The invention contemplates the use of strong base anionic exchange resins, and, in fact, practically any strong base anionic exchange resin may be employed. As a class, these resins are high molecular weight poly bases which are virtually insoluble in the media wherein they are to be used. They consist of a 3-dimensional polymer network to which are attached a plurality of cationic radicals which maintain their cationic character regardless of pH. These act as the anion exchangers. Especially suitable are the quaternary ammonium anion exchange resins, typical of which are the products of amination with the trimethyl amine or dimethyl ethanol amine of chloromethylated polymers, for example, chloromethylated styrene-divinyl benzene copolymers. Representative commercially available exchangers of these types are Amberlite IRA-400, IRA-401 and IRA-410 of Rohm and Haas Company; Dowex-1 and Dowex-2 of Dow Chemical Company, Nalcite SBR and SAR of National Aluminate Corporation, Permutit S-2 of Permutit Company and Duolite A-42 and A-40 of Chemical Process Company. U.S. Patents 2,388,235 and 2,591,573 describe processes for producing ammonium exchange resins which can be converted to salts useful in practicing the invention. The Dowex and Nalcite resins are of the general formula $R_4N^+ \cdot A^-$, in which one of the R's is derived from polystyrene which has been cross-linked with divinyl benzene. In the case of Dowex 2 and Nalcite SAR, two R groups are methyl groups and one R group is a hydroxyethyl group. In the case of Dowex-1 and Nalcite SBR, the three remaining R groups are methyl groups. The resultant ammonium exchange resin is a highly dissociated organic base, in which the large cationic body is immobile and the relatively small and mobile anion is free to exchange. Particular success has been achieved in practicing the process of the present invention through the use of Dowex I-X8, which is representative of the group set forth hereinbefore. An exchanger in the form of the anion of an acid with ionization constant ($K_a$) less than $10^{-2}$ is particularly desirable.

It has been found that the equilibrium of the reaction set forth in Equation 3 is driven virtually to completion on the resin. Moreover, the front boundary of the $SO_2$ zone in the bed is thus self-sharpening. It has also been found that the break-through capacity of the resin is about 1.11 moles of $SO_2$ per liter of resin bed. This is more than 85% of over-all ion exchange capacity of the resin. Moreover, it has been found in the commercial preparation of sulfolane that with a feed containing 450 p.p.m. $SO_2$, about 200 bed volumes can be processed in one cycle. Under such conditions the removal of $SO_2$ contaminant from the sulfolene is in excess of 99.3%. The use of alcohol, such as isopropyl alcohol, does not adversely affect the resin life.

In accordance with the invention, when the ion exchange is conducted in the absence of alcohol, such as isopropyl alcohol, the resin may then be in the base or hydroxy form. On the other hand, it is a preferred embodiment to use the ion exchanger in the presence of alcohol which may or may not contain minor amounts of water, when the resin may then be in the form of a salt such as, for example, the acetate or carboxylate salt. The salt form of the resin is preferred in this latter instance to minimize loss of sulfolene by formation of ether with the alcohol which is catalyzed by a resin in strong base form.

*Example*

*Conditioning of the Resin.*—A portion of Dowex 1–X8 standard grade anion exchanger resin was conditioned by repeated anion exchange cycles alternately with 1 M NaOH and 1 M HCl (about 4 liters per 50 grams of resin per cycle for 4 hours), and washing with distilled water (about 4 liters) after each conversion. Conditioning was carried out on a Buchner funnel in such a manner that the resin never became dry. The resin so-conditioned was stored in $Cl^-$ form under about 0.1% NaCl solution.

*Preparation of the Column.*—About 500 grams of the resin were converted to $CO_3^=$ form in a column of 2 inches in diameter by passing therethrough about 8 liters of 1 M aqueous $Na_2CO_3$ solution. Tests for $Cl^-$ in the last fractions of the effluent were negative. The resin was then washed with 4 liters of methanol and subsequently with 8 liters of isopropyl alcohol. 60 ml. of the resin were transferred into a column of 1 inch internal diameter. The bed was backwashed with isopropyl alcohol.

*Preparation of Feed.*—A feed containing 450 p.p.m. $SO_2$ and major amounts of sulfolene was produced from the condensation reaction of butadiene with $SO_2$ in isopropyl alcohol, followed by stripping most of the untreated $SO_2$ therefrom.

*Column Operation.*—The feed was passed through the column at a flow rate of about 3 to 5 bed volumes per hour. Regular titration checks for the appearance of $SO_2$ in the effluent were performed. $SO_2$ in the effluent was first detected when 200 bed volumes of feed had passed through the column. The total effluent up to this point contained less than 3 p.p.m. $SO_2$, the first 50 bed volumes less than 0.2 p.p.m.

*Hydrogenation.*—The sulfolene thus freed from contaminating $SO_2$ was fed into a hydrogenation zone wherein sulfolane was produced by hydrogenating in the presence of a Raney nickel catalyst. The life of this catalyst was prolonged indefinitely and substantially pure sulfolane resulted therefrom.

*Regeneration of Resin.*—An excess of $Na_2CO_3$ was used as regenerant after draining the column. Such excess was several times the stoichiometric amount and the sodium carbonate solution was passed into the column upwardly and withdrawn from the top thereof. The resin was then found to be in renewed condition for further SO₂ removal.

With regard to the particular type of alcohol to be used in the condensation reaction between the alkadiene and the sulfur dioxide, isopropyl alcohol has proven particularly useful in that it reduces the formation of polysulfone and improves separation by filtration of any polysulfone which may be formed.

The sulfolanes manufactured in this manner are particularly useful as selective solvents for the separation of organic compounds. They are specifically applicable to the separation of mixtures of hydrocarbons of different degrees of saturation such as, for example, the separation of aromatics from non-aromatics, olefins from diolefins and monoolefins from saturates. The sulfolanes produced by this invention possess an enhanced stability in the processes involved in such extractions.

We claim as our invention:

1. In a process for the synthesis of a sulfolane which comprises reacting a conjugated alkadiene with sulfur dioxide to form a reaction product containing essentially a corresponding sulfolene and catalytically hydrogenating a sulfolene to a corresponding sulfolane in the presence of a sulfur-sensitive hydrogenation catalyst, the improvement of treating the reaction product containing the sulfolene with a strong base anionic exchange resin consisting essentially of a high molecular weight polymeric network to which are attached a plurality of cationic radicals to substantially remove sulfur-containing poisons of catalytic hydrogenation catalysts.

2. Process in accordance with claim 1 wherein the strong base anionic exchanger is in $CO_3^=$ form.

3. Process in accordance with claim 1 wherein the anionic exchanger is in the form of the anion of an acid with $K_a$ les than $10^{-2}$.

4. Process in accordance with claim 1 wherein the strong base anionic exchanger is in $SO_3^=$ form.

5. Process in accordance with claim 1 wherein the alkadiene is butadiene.

6. Process in accordance with claim 1 wherein the alkadiene is isoprene.

7. Process in accordance with claim 1 wherein the sulfolene contaminated wtih sulfur dioxide is treated with a strong base anion exchanger in the form of a salt of a weak acid in the presence of a monohydric alcohol containing from one to four carbon atoms.

8. Process in accordance with claim 7 wherein said monohydric alcohol is isopropanol.

9. Process in accordance with claim 1 wherein the hydrogenating of the sulfolene is effected prior to the reversion of substantial amounts of the sulfolene.

References Cited in the file of this patent

UNITED STATES PATENTS

| | | |
|---|---|---|
| 2,360,859 | Evans et al. | Oct. 24, 1944 |
| 2,451,298 | Morris et al. | Oct. 12, 1948 |
| 2,578,565 | Mahan et al. | Dec. 11, 1951 |

FOREIGN PATENTS

| | | |
|---|---|---|
| 936,442 | Germany | Dec. 15, 1955 |

OTHER REFERENCES

Calman et al.: Ion Exchangers in Organic and Biochemistry, 1957, Interscience Publishers, Inc., New York, New York, page 642.